(12) United States Patent
Lange

(10) Patent No.: US 8,828,237 B2
(45) Date of Patent: Sep. 9, 2014

(54) METHOD AND SYSTEM FOR RECOVERING OIL AND REMOVING OIL FROM A RESULTING OIL-WATER MIXTURE

(75) Inventor: Neville Ernest Lange, Gloucester (GB)

(73) Assignee: Veolia Water Solutions and Technologies Support, Saint-Maurice (FR)

( * ) Notice: Subject to any disclaimer, the term of this patent is extended or adjusted under 35 U.S.C. 154(b) by 257 days.

(21) Appl. No.: 13/557,688

(22) Filed: Jul. 25, 2012

(65) Prior Publication Data
US 2014/0027389 A1 Jan. 30, 2014

(51) Int. Cl.
*B01J 49/00* (2006.01)

(52) U.S. Cl.
USPC .......................................... 210/671; 210/269

(58) Field of Classification Search
USPC .......... 210/671, 675–676, 677, 691, 269, 275
See application file for complete search history.

(56) References Cited

U.S. PATENT DOCUMENTS

| 5,407,574 A | 4/1995 | Hensley |
| 5,635,080 A | 6/1997 | Hensley |
| 5,746,913 A | 5/1998 | Chang et al. |

*Primary Examiner* — Chester Barry
(74) *Attorney, Agent, or Firm* — Coats and Bennett PLLC

(57) ABSTRACT

A filtering device comprises a vessel for containing filtering media such as nutshells. Associated with the filtering device is an eductor for scrubbing and cleaning the media and removing contaminants such as oil from the media. The eductor includes an inlet port for receiving a motive liquid. Further, the eductor includes an inlet port for receiving media held in the vessel. In operation, a motive liquid is directed into the eductor and this induces media in the vessel into the eductor. By continuously directing motive liquid from an external source into the eductor, this results in the media being fluidized and circulated and recirculated through the eductor, giving rise to a slurry that contains liquid, the media and removed contaminants. A portion of the slurry is discharged from the filtering device while the media is retained in the filtering device.

20 Claims, 5 Drawing Sheets

METHOD AND SYSTEM FOR RECOVERING OIL AND REMOVING OIL FROM A RESULTING OIL-WATER MIXTURE

FIELD OF THE INVENTION

The present invention relates to a filtration apparatus, and in particular to a media filtration apparatus, such as a nutshell media filtration apparatus.

BACKGROUND OF THE INVENTION

Media filters are well known in the art for use in removing contaminants from fluids, such as the removal of suspended solids from water. Media filters typically comprise granular filtration media, such as sand, anthracite, gravel or the like, arranged to form a filter bed within a filter vessel, wherein the fluid to be treated flows through the filter bed such that suspended solids become trapped in the interstices formed between individual granules of media.

Many filtration applications may also require the removal of a selected liquid component from a mixture or emulsion, such as the removal of oil from water. In such cases a filtration media may be selected which has an affinity for the liquid component to be removed. For example, the use of nutshells, such as walnut or pecan nutshells can remove oil from water, wherein the oil is adsorbed on to the surface of the nutshells. Nutshell filtration media is used in the oil and gas industry, for example for removing oil and other contaminants from water produced from a subterranean formation. Following a nutshell filtration stage, and other treatment stages if required, the filtered water may be disposed of or reused, for example by reinjection back in to the formation.

Over time the filtration media will become choked or clogged, for example by significant retention of suspended particles and/or coating with a liquid contaminant, resulting in a reduction in the efficiency of the filter. To address this, the filtration media is regularly cleaned, for example by backwashing, media scrubbing or the like.

Backwashing normally requires a volume of water to be flushed across the media in a reverse direction to remove filtered particulate matter. However, backwashing alone may not adequately remove all contaminants, such as oil, adhered to the media. In such cases it is known to mechanically scrub the media to remove the adhered contaminant.

Scrubbing may be achieved by first fluidizing the media bed by circulating fluid across the media to create a media slurry, and then circulating the slurry from the filtration vessel through a pump, typically a centrifugal pump. The shearing action of the media passing through the pump impeller liberates the adhered contaminant from the media and transfers it into the liquid phase. To remove the liberated contaminants from the filter a portion of the liquid phase and hence also a portion of the contaminants is removed from the filtration vessel for disposal or other treatment, with the cleaned media being returned to the filtration vessel with the other portion of the liquid phase and hence also other portion of the liberated contaminants. After the scrubbing has continued for a suitable period, the pump is stopped and the media is allowed to settle to reform the media bed.

However, in this pump scrubbing arrangement there is a risk that the media slurry may become too concentrated due to the removal of too much liquid, which may result in the media slurry becoming non flowable or "solidifying" within the scrubbing circuit, requiring significant remedial attention. Such a risk therefore requires continual monitoring of fluid being delivered into and removed from the system. Also, filtration vessels using a pump scrubbing circuit must ensure that the vessel has a sufficient freeboard volume, i.e., a sufficient volume in addition to the media volume, to ensure that a dilute enough media slurry can be achieved and maintained so that it does not solidify when the portion of the fluid is removed from it. However, the requirement of an increased freeboard volume results in an overall increase in the size of the equipment, which in many applications is undesirable.

Furthermore, the level of shear and other forces established within the pump may result in significant attrition of the media, reducing its useful life-span.

SUMMARY OF THE INVENTION

The present invention entails a filtering device for removing contaminants such as suspended solids and oil from a feedwater stream such as, for example, a produced water stream. The filtering device includes filter media. After a period of filtration when the filter media becomes inefficient because of the amount of contaminant trapped by the media or adsorbed onto the media, the media is scrubbed by fluidizing the media and inducing the fluidized media through an eductor which exerts shearing forces on the media and causes contaminants adsorbed or adhered to the media to be separated from the media. The separated contaminant is contained within a slurry or other liquid and is discharged from the filtering device.

In order to induce fluidized media into the eductor, a motive fluid or liquid is delivered to the eductor. This results in a low pressure at the suction port of the eductor and in the filtering device which is connected to the suction port and the fluidized media, in the form of a slurry, is effectively sucked into the eductor. As the media passes through the eductor, the motive liquid mixing with the media causes the media to experience substantial turbulence in a mixing or scrubbing section of the eductor. This mixing and turbulence provides a scrubbing action which is effective to remove contaminants such as oil that has become adsorbed onto the media. This also results in the formation of a liquid or a slurry that includes the media as well as removed contaminants. The slurry is continuously recirculated through the eductor until a substantial amount of the adsorbed contaminants have been removed from the media. During this process a portion of the liquid or slurry containing the removed contaminants is discharged from the filtering device while the media contained within the liquid or the slurry is retained in the filtering device.

DESCRIPTION OF EXEMPLARY EMBODIMENTS

Figure 1:
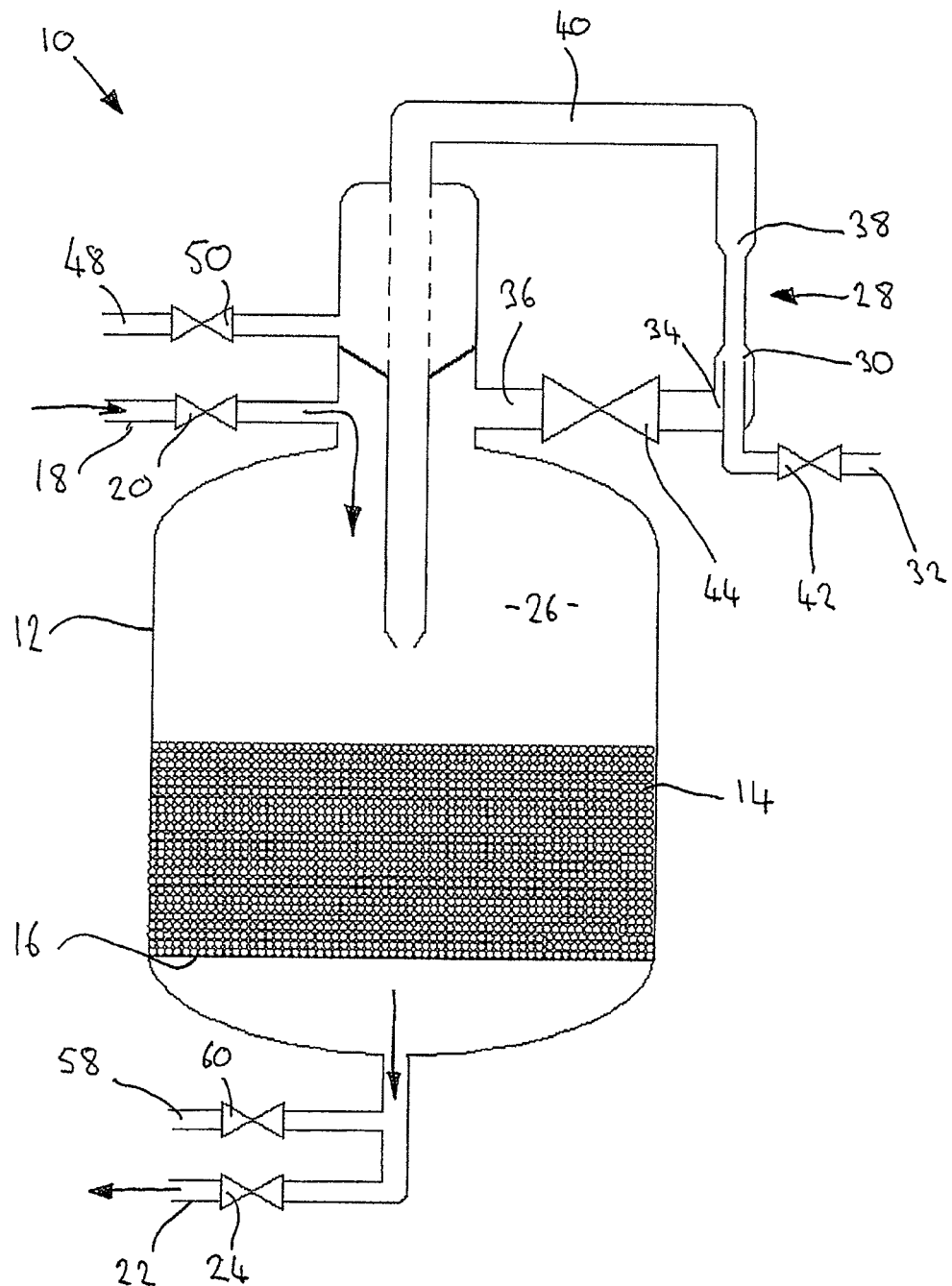
FIG. 1 is a schematic representation of a filtration apparatus in accordance with an embodiment of the present invention, shown operated in a filtration mode.

With further reference to the drawings, a filtration apparatus is shown therein and indicated generally by the numeral 10. As will be discussed below, the filtration apparatus or filtering device 10 is designed to remove oil from water and will also remove other contaminants such as suspended solids. Apparatus 10 comprises a vessel 12 which contains therein filtration media 14 which in one embodiment comprises a nutshell media. Nutshells have an affinity for oil and as such can be used in a filtration apparatus for removing oil from water. The nutshell media 14 in the configuration of FIG. 1 is arranged to form a media bed supported by a screen 16 that retains the media in the filtering device 10. It should be pointed out that other types of media, such as plastic beads for example, could be employed in the filtering device 10.

The filtering device 10 comprises an inlet conduit 18 which incorporates a valve 20 configured to permit selective fluid communication of the conduit with the vessel 12. Inlet conduit 18 receives the water or liquid to be filtered. Filtering device 10 also comprises a clean water outlet conduit 22 which incorporates a valve 24 configured to permit filtered water or liquid to be discharged from the vessel 12. In a filtration mode of operation, as shown in FIG. 1, water to be treated is delivered into vessel 12 via inlet conduit 18, and permeates downwardly through the bed of media 14, with clean water or filtrate being discharged from the vessel 12 through the outlet conduit 22. As water permeates through the media 14, particulates or suspended solids become trapped in the intersitces formed between the respective media, and oil within the water becomes adsorbed or adhered to and retained by the surfaces of the media.

Vessel 12 defines a volume sufficient to permit an appropriate depth of a media bed to be established, in addition to a freeboard volume 26 which, as will be discussed in detail below, permits the media 14 to be fluidized to form a slurry during a media scrubbing mode of operation.

Prolonged use of the filter device 10 in the filtration mode will result in soiling of the media 14, particularly by oil adhering to individual nutshells when nutshells are used as the filter media. As such, the media 14 must be treated to remove the adsorbed or adhered oil to maintain filtration efficiency. As used herein, the term adsorbed or adhered means that the oil within the water becomes attached, connected or associated with the media. These terms are interchangeably used to simply mean that the oil has become associated or somehow connected, adsorbed, or adhered to the media. To maintain filtration efficiency, the media is scrubbed to particularly remove oil and other contaminants. In one embodiment, this is achieved by circulating the media through a scrubbing section or arrangement to remove the oil. In the filter device 10 of one embodiment, an eductor 28 is provided to both circulate and scrub the media, which will be described in further detail below.

Eductor 28 includes a motive fluid or liquid port 30 that is in communication with an external fluid source via a conduit 32. In addition, eductor 28 has associated therewith a suction port 34 which is in communication with the vessel 12 via a conduit 36. Further, the eductor 28 has associated therewith a discharge port 38 which is in communication with the vessel 12 via a conduit 40. Conduits 32 and 36 each include respective valves 42 and 44 which provide for selective fluid communication therethrough.

Figure 2:
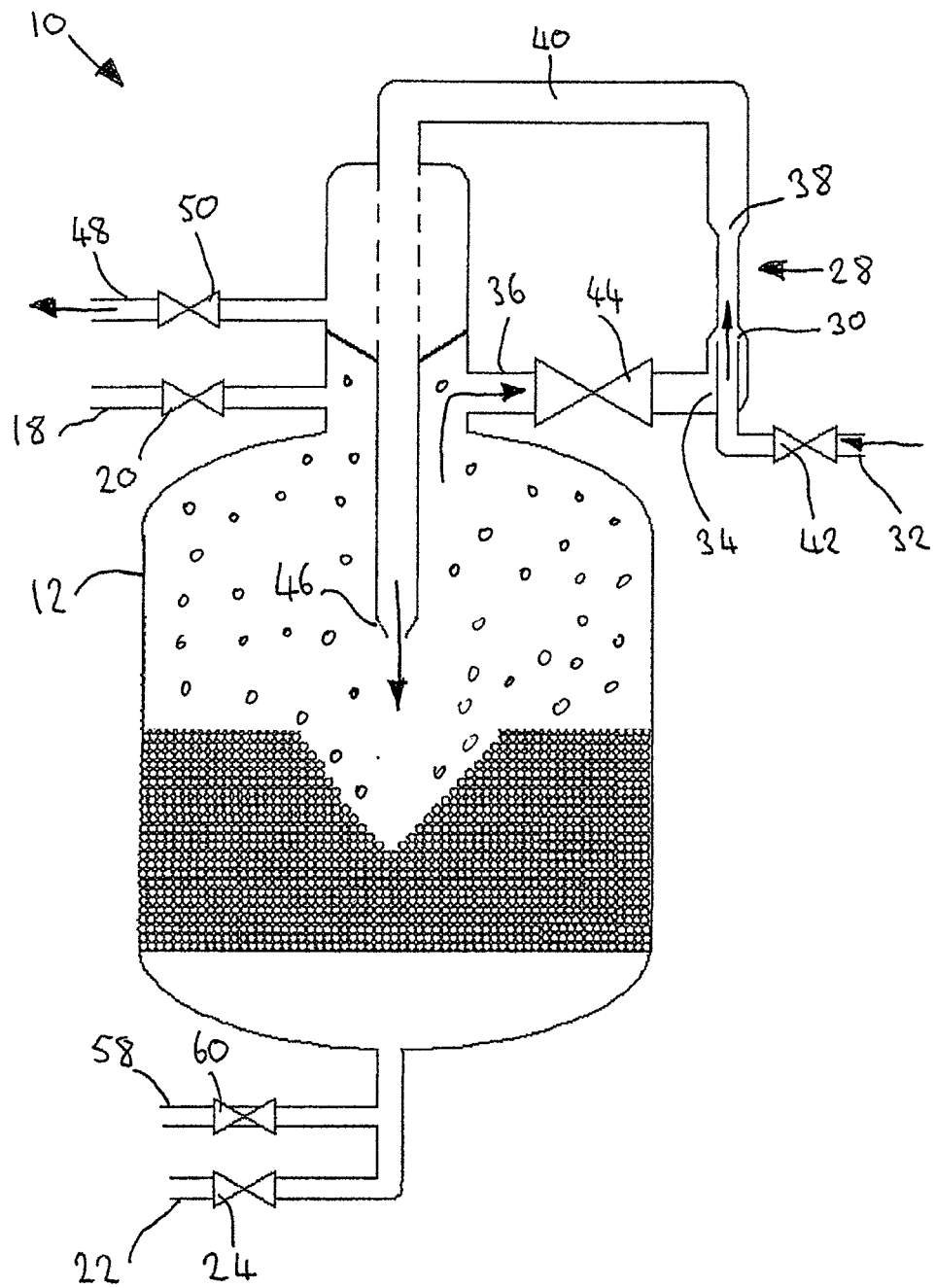
FIG. 2 is a schematic illustration of the filtration apparatus of FIG. 1 shown in an initial stage of a scrubbing mode.
Figure 3:
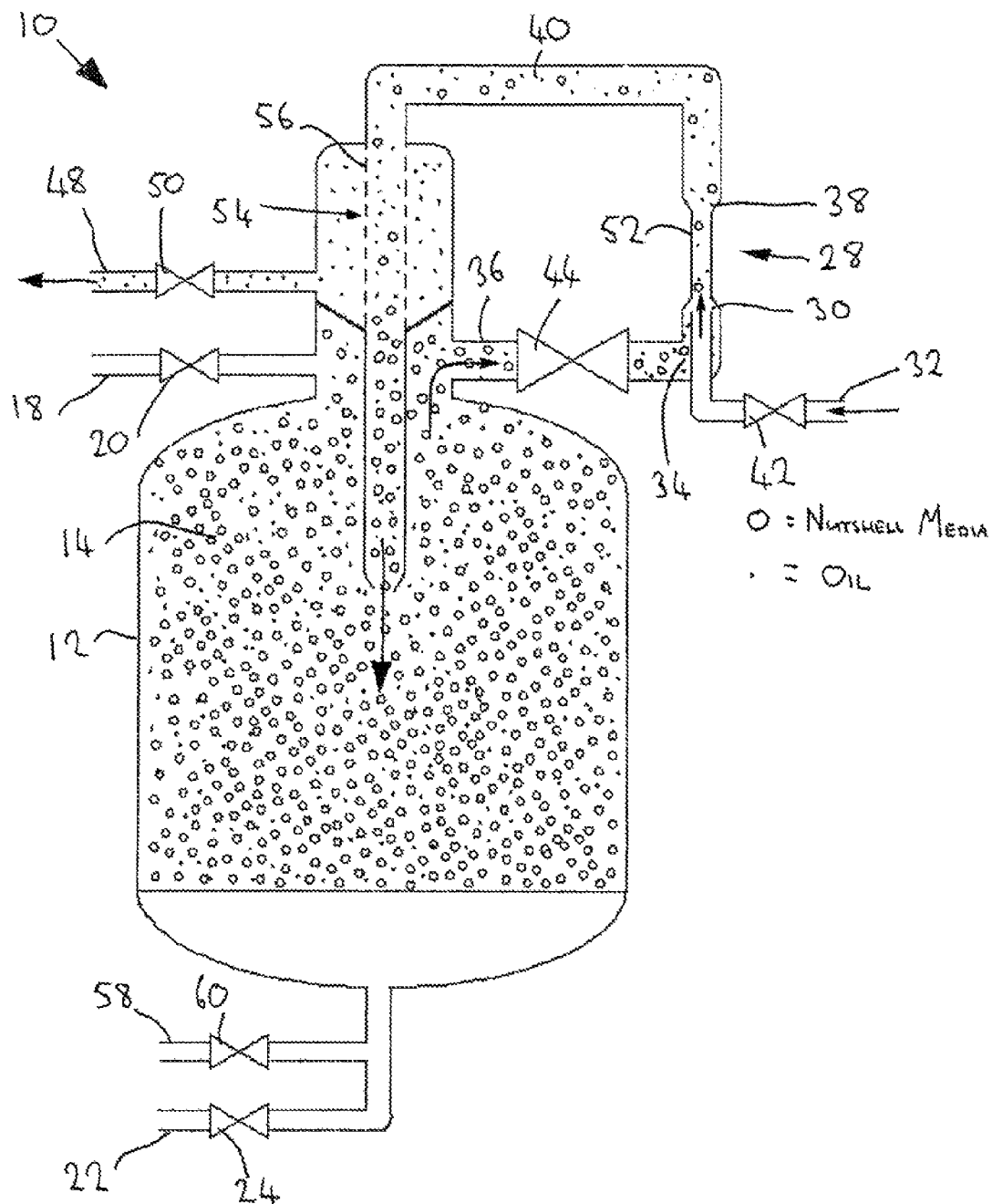
FIG. 3 is a schematic illustration of the filtration apparatus of FIG. 1 shown in a full scrubbing mode

The operation of the filtering device 10 in a scrubbing mode of operation is shown in FIGS. 2 and 3. With reference to FIG. 2, the filtering device 10 is shown in the initial stages of the scrubbing mode of operation. Initially, valves 20 and 24 are closed and valve 60 was already closed with water being retained in the freeboard volume 26 (FIG. 1). Valve 42 is open to enable motive liquid to be directed into the eductor 28, and valve 44 is open to permit the eductor 28 to induce water from the vessel 12 into and through the eductor suction port 34. Eductor 28 discharges the fluid through the discharge port 38 and conduit 40 to be returned to the vessel 12. A nozzle 46 is provided on the end of conduit 40 and generates a jet stream of water which is directed in FIG. 2, for example, downwardly towards the underlying media 14. The produced jet stream of water disturbs and agitates the bed of media 14, again as shown in FIG. 2.

As fluid from an external source is continuously introduced into the vessel 12, through the eductor port 30, a scrub discharge conduit 48 is provided to permit continuous and equal discharge of fluid from the vessel 12 during the scrubbing operation. Scrub discharge conduit 48 also facilitates removal of contaminants such as oil scrubbed from the media 14. Conduit 48 comprises a valve 50 arranged to permit selective fluid communication through the conduit.

Continued circulation of water by the eductor 28 will eventually result in the media 14 becoming suspended or fluidized in the water which results in a slurry. The slurry including the media 14 will be circulated and recirculated through the eductor 28 as shown in FIG. 3. In this respect, the eductor 28 comprises a mixing conduit 52 in which the motive liquid directed into port 30 mixes with the slurry from the vessel 12 and this vigorous mixing within the mixing conduit 52 generates shear and other forces which results in the scrubbing of the media passing therethrough. Scrubbing of the media occurs by the rubbing of the media on the walls of the pipes or conduits that contain it, rubbing of the media against other media particles, and subjecting the media to large shear gradients which occurs in turbulence. In the case of the present invention, this mostly occurs in the mixing throat of the eductor 28 where the high velocity of the motive liquid mixes with the media slurry that is drawn from the vessel 12. It should be pointed out that the oil scrubbed from the media goes into the water phase of the slurry. Thus it is appreciated that the eductor 28 permits oil to be scrubbed from the media 14, such that a treated slurry is discharged from the eductor 28 via conduit 40. In the case of treating an oil-water mixture, the treated slurry discharge comprises a water or liquid component, an oil component and the media 14.

It should be noted that the length of the mixing conduit 52 may be varied to modify the scrubbing effect within the mixing conduit.

Filtering device 10 further comprises a media separator 54 which typically includes a screen 56 configured to retain the media while permitting passage of the water and oil components therethrough to be discharged through the conduit 48 for further treatment or disposal.

After sufficient circulation and scrubbing of the media 14 has occurred, the eductor 28 is deactivated by closing valve 42 to prevent the motive liquid from entering the eductor. The media 14 settles and the filter bed as shown in FIG. 1 is re-established. After the bed has settled, valve 20 is opened to permit communication of water through conduit 18 and into the vessel 12, and a flush conduit 58 is opened by valve 60 to permit any contaminants and the like retained within the media bed to be flushed out of it. Once sufficient flushing of the filtering device 10 is achieved, the device may be returned to the filtration mode of operation described in relation to FIG. 1.

The motive fluid or liquid used to operate the eductor 28 may be provided from many different suitable sources external to the vessel 12. In one embodiment, the feedwater to the filtering device is used as the motive liquid. The motive liquid is pressurized prior to entering the eductor 28. Various pressures can be used, but in one embodiment the pressure of the motive liquid is approximately 75 to approximately 100 psi greater than the pressure in the vessel. In another example, the motive liquid may be provided from a stream of water pressurized to the high pressure necessary for it to be injected into a well bore. Such an arrangement is shown in FIG. 4.

Figure 4:
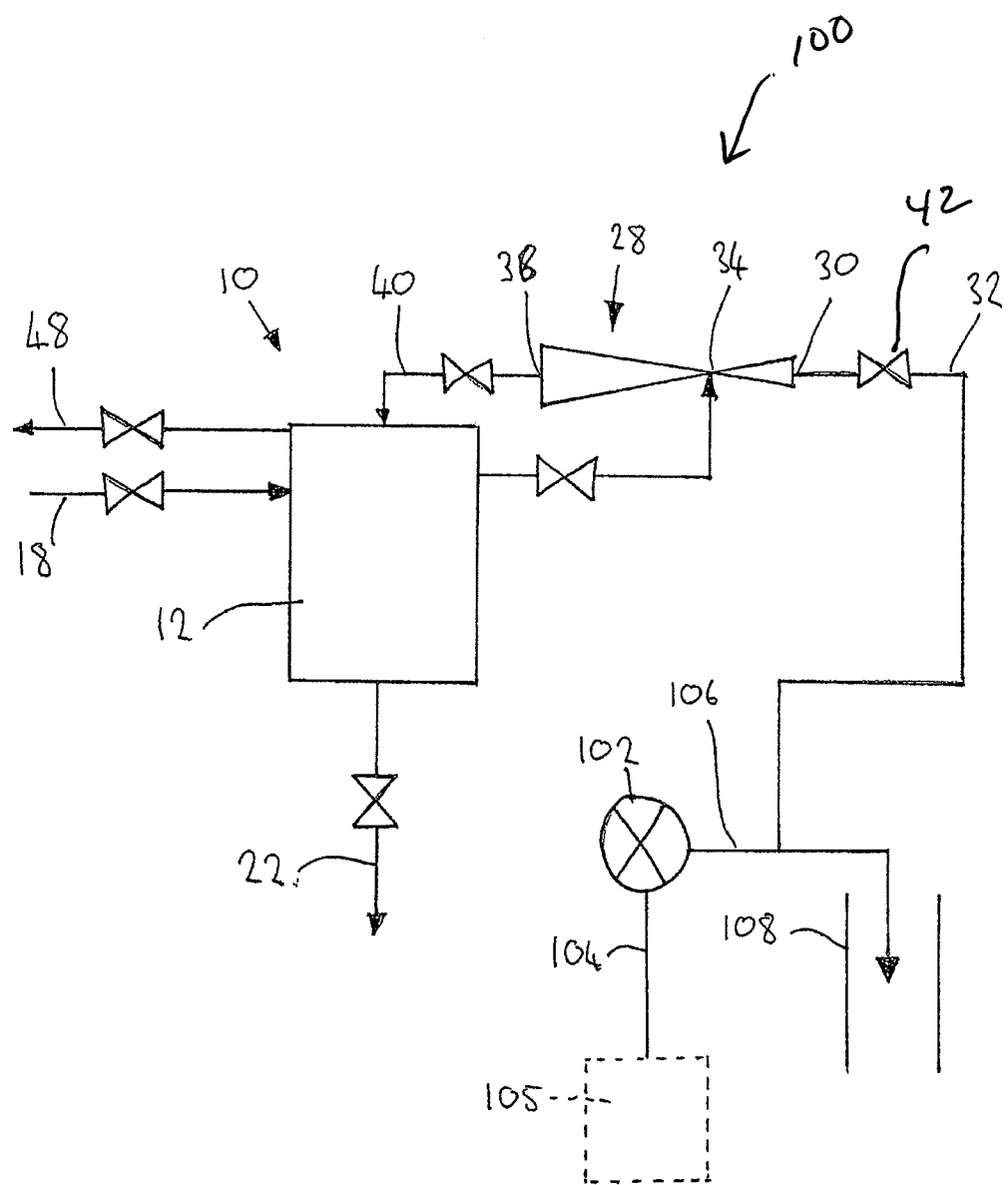
FIG. 4 is a schematic illustration of a filtration system according to one embodiment of the present invention, incorporating the filtration apparatus of FIG. 1.

FIG. 4 is a diagrammatic representation of a fluid treatment system generally indicated by numeral 100 which incorporates the filtering device 10 shown in FIGS. 1-3. The filtering device 10 is provided to function as discussed above, and as such no further description will be given.

System 100 includes an injection pump 102 which is configured to receive water through an inlet conduit 104 from a suitable source 105 to be pressurized and discharged through an outlet conduit 106 to subsequently be injected into a well bore 108. Motive liquid port 30 of the eductor 28 is in selective communication with the pump discharge outlet 106 via conduit 32 and valve 42 such that opening the valve 42 permits a portion of the injection water from the discharge conduit 106 to be redirected to operate the eductor 28. Accordingly, the eductor 28 may be operated using an existing and established stream of pressurized water, eliminating the requirement for a dedicated water stream to be provided.

Figure 5:
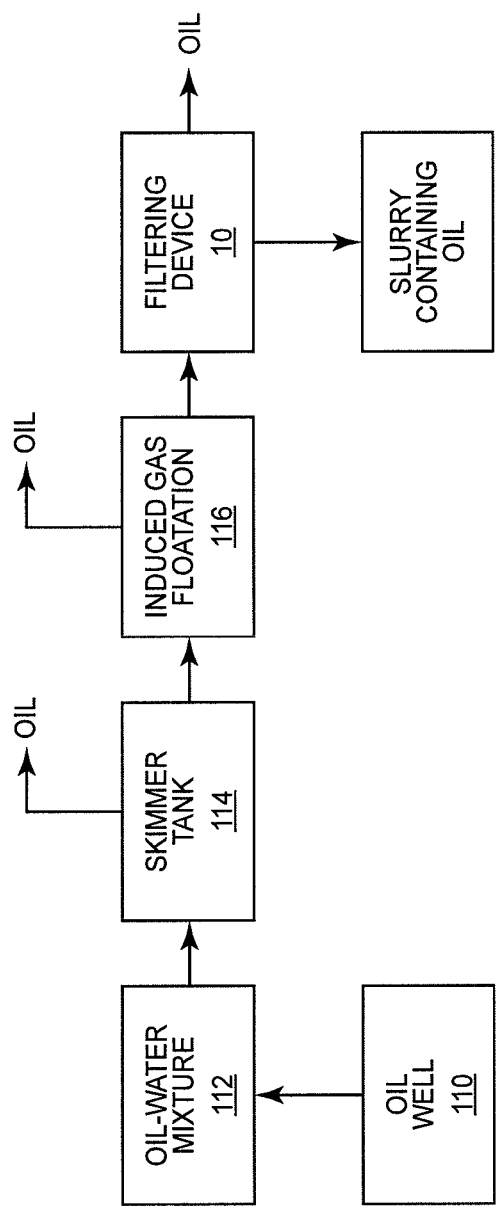
FIG. 5 is a schematic illustration of a process for treating produced water where the filtration apparatus of the present invention is utilized in a polishing process to remove oil from an oil-water mixture.

One application of the filtering device 10 is in treating produced water. An exemplary application is shown in FIG. 5. In the FIG. 5 process, an oil-water mixture (block 112) is removed from an oil well 110. Once the oil-water mixture has been removed from the oil well, there are various processes to separate oil from the oil-water mixture. In the exemplary process shown in FIG. 5, the oil-water mixture is directed to a skimmer tank 114. The skimmer tank functions to skim oil from the oil-water mixture. Downstream from the skimmer tank in this exemplary process is an induced gas flotation oil separating device 116. Here gas is dispersed in the tank and is effective in removing additional oil from the oil-water mixture. At this stage, a substantial portion of the oil has been removed from the water but there is still oil remaining in the water that can be removed at least partially or substantially by the filtering device 10 discussed above. Thus the effluent from the induced gas flotation unit 116 is directed into the inlet conduit 18 and the oil-water mixture flows downwardly through the media bed shown in FIG. 1. During this process, oil associated with the water is removed therefrom and attaches or adheres or is adsorbed onto the media. The filtered oil-water mixture, or filtrate, is directed out the outlet conduit 22 and can be subjected to further downstream treatment to remove other contaminants such as silica, hardness and dissolved solids.

The filtering device 10 is also useful in treating produced water in offshore applications. In this case, instead of using some of the subprocesses discussed above, the oil-water mixture could be passed through a hydrocyclone and then passed through a degassing vessel, a compact gas flotation unit, or a non-compact gas flotation unit, and then the effluent therefrom directed into and through the filtering device 10 of the present invention.

There are many advantages to the filtering device 10 of the present invention. In the scrubbing cycle, all valves are closed except valves 42 and 44. This means that the slurry which flows into the eductor suction port 34 is diluted in the eductor 28 by the motive water entering through conduit 32 and because the system is formed from closed vessels of fixed volume, the same volume of water is separated from the slurry in the media separator 54 and discharged from conduit 48 which therefore concentrates the slurry to the same concentration as it was when it was sucked into the eductor. This means that the system will never take out so much water that the media slurry will solidify in the eductor 28 or scrubbing circuit. Because of this advantage, a large freeboard volume in the vessel is not required and the vessel can be shortened. In prior art designs, the media slurry concentration is set by the volume of the vessel and the volume of the media in the vessel and this must be matched to the backwash rate so that the media slurry does not solidify in the scrubbing circuit and this requirement leads to the vessel having a large freeboard volume. In one exemplary design of the present invention, the backwash flow rate is reduced but the duration of the backwash would increase. If the vessel is shortened as the present invention allows, then the total volume of liquid used during the backwash is reduced because this backwash volume is generally based on it providing approximately three to approximately four volume changes in the vessel 12. In the alternative, better cleaning could be achieved by using the same volume of water and having more volume changes.

Another advantage of the present invention is that the design of the present invention could allow for a deeper bed of media in an existing size vessel, thereby providing for better filtration and longer runtimes between scrubbing.

There is also an operability advantage to the present invention. In existing pump systems, if the pump flow reduces due to wear of the pump or its drive belts slip or if the backwash flow increases which can happen if the vessel pressure increases or the backwash flow control system malfunctions, this may result in the media slurry solidifying in the scrubbing circuit. In the present invention, the backwashing or scrubbing process is entirely driven by the backwash inlet flow and fluctuations in it cannot cause the media to solidify in the scrubbing circuit.

The present invention also provides for the use of an eductor 28 to circulate and scrub the media and this may reduce the attrition rate of the media due to the elimination of rotary pump components such as impellers. In this regard, it is clear that the eductor does not have the particular features of a pump that obviously will cause media attrition such as small clearances between moving parts in which the media could be "ground up" such as wear rings that extend around the impeller eye or pumping vanes on the impeller back plate.

The employment of the eductor 28 eliminates problems associated with mechanical seals that form a part of many nutshell filter systems. Many of the prior art nutshell filtration systems use a pump or mixer associated with each filter vessel to create the slurry and scrubbing action. The mixer design, for example, includes a mixer shaft that extends into the vessel and this means a mechanical seal that is difficult to service. In addition, pumps that are used to create the slurry and scrubbing operation also include mechanical seals that can fail and require servicing. The invention, on the other hand, uses the eductor to create the scrubbing action and therefore no seals are associated with the filter vessel.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of recovering oil from an oil well and removing oil from a resulting oil-water mixture, the method comprising:
   removing an oil-water mixture from an oil well;
   separating oil from the oil-water mixture to produce produced water;
   wherein separating the oil from the oil-water mixture includes directing the oil-water mixture into a filtering device having filtering media contained therein and adsorbing oil onto the media and producing a produced water stream that is relatively free of oil;

at selected times scrubbing the media within the filtering device and removing oil from the media, the method of scrubbing the media including:

directing a motive liquid into an eductor associated with the filtering device;

fluidizing the media in the filtering device and inducing the fluidized media into the eductor;

the eductor mixing the media with the motive liquid and driving the media through a scrubbing section in the eductor which results in oil being removed from the media and produces a slurry that contains the media and removed oil;

separating the media from at least a portion of the slurry and discharging the portion of the slurry and the removed oil contained in the portion of the slurry discharged;

continuing to direct motive liquid into the eductor and inducing the fluidized media into the eductor and into contact with the scrubbing section of the eductor; and continuing to discharge a portion of the slurry containing oil removed from the media.

2. The method of claim 1 wherein the scrubbing section of the eductor comprises a mixing conduit and wherein the method comprises mixing the media and motive liquid in the mixing conduit.

3. The method of claim 1 including pumping the motive liquid from a source into an inlet port on the eductor, and wherein the movement of the motive liquid through the eductor induces media into a suction port associated with the eductor.

4. The method of claim 1 wherein the filtering device is located downstream from one or more other devices for removing oil from the oil-water mixture removed from the oil well, and wherein the filtering device functions as an oil removal polishing device.

5. The method of claim 1 wherein the media is contained within a vessel and the method includes directing at least a portion of the slurry exiting the eductor through a nozzle and forming the slurry into a jet stream and directing the jet stream towards the media contained in the filtering device.

6. The method of claim 1 wherein the filtering device includes an inlet for receiving the oil-water mixture to be filtered and a filtrate outlet, and wherein during the scrubbing of the media the inlet and filtrate outlets are closed.

7. The method of claim 1 including subjecting the media to shear forces as the media passes through the scrubbing section of the eductor which results in scrubbing the media and removing oil from the media.

8. The method of claim 1 wherein the media comprises nutshells and wherein as the oil-water mixture passes through the filtering device, oil is adsorbed onto the nutshells.

9. A method of scrubbing filter media contained in a filtering device wherein the media has contaminants associated therewith, the method comprising:

containing at least some liquid in the filtering device with the media having contaminants associated therewith;

directing a motive liquid into an eductor associated with the filtering device;

inducing the media and liquid into the eductor and mixing the motive liquid with the media and liquid passing through the eductor;

driving the media through a scrubbing section of the eductor and removing contaminants from the media and wherein the eductor discharges a slurry comprised of liquid, media and removed contaminants;

discharging a portion of the slurry including removed contaminants from the filtering device while retaining the media; and continuing to direct motive liquid into the eductor and causing the slurry including the media to be circulated through the eductor and continuing to discharge at least some of the slurry having the removed contaminants therein.

10. The method of claim 9 wherein the filtering device includes a vessel for holding the media and wherein the eductor lies inside or outside of the vessel; and wherein the method comprises fluidizing the media in the slurry and circulating and recirculating the slurry including the media through the eductor.

11. The method of claim 10 wherein the eductor lies outside of the vessel and the method includes circulating the slurry including the media from the vessel to and through the eductor and back to the vessel and continuing to recirculate the slurry through the eductor and back to the vessel.

12. The method of claim 9 wherein the filter media comprises nutshells.

13. The method of claim 1 including continuously recirculating the slurry including the media therein through the eductor for a selected period of time.

14. The method of claim 1 wherein after recirculating the slurry and media through the eductor for a selected period of time, ceasing the recirculation of the slurry and media through the eductor and flush cleaning the media with a water solution.

15. The method of claim 1 including directing at least a portion of oil-water mixture into the eductor and mixing the oil-water mixture with the slurry being circulated through the eductor.

16. The method of claim 1 wherein the pressure of the motive liquid being directed into the eductor is approximately 75 psi to approximately 100 psi greater than the pressure in a vessel forming a part of the filtering device.

17. A filtering device comprising:

a vessel for containing filter media;

an inlet for receiving feedwater to be filtered by the filtering device;

an outlet for directing filtered feedwater from the filtering device;

an eductor associated with the filtering device for scrubbing the media and removing contaminants from the media and generating a slurry containing a liquid portion, the media and removed contaminants, wherein the eductor is operative to cause a slurry, including the media, to be recirculated continuously over a selected period of time through the eductor;

the eductor including a motive liquid port and a suction port, wherein the motive liquid port is configured to be operatively connected to a source of pressurized motive liquid;

wherein the eductor is operative to mix motive liquid with the slurry and wherein the eductor is operative to induce the slurry including the media into the suction port;

wherein the eductor includes a scrubbing conduit that scrubs the media as the media and slurry pass through the scrubbing conduit of the eductor, causing contaminants to be removed from the media; and wherein the filtering device includes a slurry discharge outlet for discharging a portion of the slurry during a scrubbing operation while separating the media from the discharged slurry and retaining the media in the filtering device.

18. The filtering device of claim 17 wherein the eductor is contained either inside the vessel or outside of the vessel, wherein there is provided a conduit that is operatively connected to the suction port and another conduit that is operatively connected to an outlet port of the eductor, and wherein the circulated slurry is channeled through the suction port and outlet port conduits as the slurry is recirculated through the filtering device.

19. The filtering device of claim 17 wherein the filtering device forms a part of a system that includes a pump for pressurising the motive liquid fed into the motive liquid port of the eductor.

20. The filtering device of claim 17 wherein there is provided a control valve upstream of the motive liquid port and a control valve upstream of the suction port.

* * * * *